United States Patent
Yamada et al.

(10) Patent No.: US 10,587,137 B2
(45) Date of Patent: Mar. 10, 2020

(54) METHOD OF OPERATING A BATTERY AND STRUCTURE THEREFOR

(71) Applicant: Semiconductor Components Industries, LLC, Phoenix, AZ (US)

(72) Inventors: Susumu Yamada, Oizumi-machi (JP); Seiji Takai, Hirakata (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 535 days.

(21) Appl. No.: 14/047,783

(22) Filed: Oct. 7, 2013

(65) Prior Publication Data

US 2015/0097532 A1   Apr. 9, 2015

(51) Int. Cl.
*H01M 10/44* (2006.01)
*H01M 10/46* (2006.01)
*H02J 7/00* (2006.01)

(52) U.S. Cl.
CPC .......... *H02J 7/0063* (2013.01); *H02J 7/0047* (2013.01); *H02J 7/0048* (2020.01); *H02J 2007/0067* (2013.01)

(58) Field of Classification Search
CPC .............................. H02J 7/0075; H02J 7/0073
USPC .......... 320/136, 125, 137, 132, 149; 702/63; 368/118; 710/260
See application file for complete search history.

(56) References Cited

U.S. PATENT DOCUMENTS

| | | | | |
|---|---|---|---|---|
| 3,796,940 A | * | 3/1974 | Mauch | H02J 7/0078 320/119 |
| 4,992,720 A | * | 2/1991 | Hata | H02J 7/0081 320/133 |
| 7,737,659 B2 | | 6/2010 | Morioka | |
| 8,344,698 B2 | * | 1/2013 | Kikuchi | H01M 10/121 320/150 |
| 8,896,270 B2 | * | 11/2014 | Tanaka | H02J 7/0031 320/134 |
| 2004/0168005 A1 | * | 8/2004 | Civlin | G06F 11/3409 710/260 |
| 2010/0019727 A1 | * | 1/2010 | Karden | B60L 11/1861 320/129 |
| 2010/0327814 A1 | * | 12/2010 | Chi | H01M 10/44 320/135 |
| 2011/0156641 A1 | | 6/2011 | Kishiyama | |
| 2011/0156652 A1 | | 6/2011 | Kishiyama | |
| 2012/0161715 A1 | * | 6/2012 | Park | H02J 7/0016 320/136 |

(Continued)

OTHER PUBLICATIONS

"Li-Ion BMS White Paper" by Davide Andrea, Elithion, Jul. 21, 2011, http://liionbms.com/php/wp_bms_chips.php.*

*Primary Examiner* — Edward Tso
(74) *Attorney, Agent, or Firm* — Rennie William Dover

(57) ABSTRACT

In accordance with an embodiment, a method for discharging a power source such as, for example, a battery, includes determining a capacity of the battery and discharging the battery in response to the capacity of the battery being greater than a reference level. In accordance with another embodiment, a circuit suitable for use with a battery includes a power measurement circuit coupled to a discharge indicator circuit, a control circuit, and a load. The discharge indicator circuit is coupled to the control circuit, which is coupled to a switch configured for activating a discharge operation through the load.

12 Claims, 3 Drawing Sheets

(56) References Cited

U.S. PATENT DOCUMENTS

| | | | |
|---|---|---|---|
| 2012/0206107 A1* | 8/2012 | Ono | H02J 7/0029 |
| | | | 320/136 |
| 2012/0262107 A1 | 10/2012 | Zhao et al. | |
| 2013/0147433 A1* | 6/2013 | Chen | H02J 7/0013 |
| | | | 320/112 |
| 2013/0249488 A1* | 9/2013 | Ju | B60L 11/1859 |
| | | | 320/112 |
| 2013/0307481 A1* | 11/2013 | Ding | G01R 31/3634 |
| | | | 320/124 |

* cited by examiner

METHOD OF OPERATING A BATTERY AND STRUCTURE THEREFOR

BACKGROUND

The present invention relates, in general, to electronics and, more particularly, to methods of forming semiconductor devices and structure.

Power or charge storage units such as, for example, lithium ion batteries are used in a variety of applications including consumer electronics, automotive, aerospace, airline, nautical, heavy equipment, remote sensing, etc. In the past, lithium ion batteries have been charged in a two-step process in which the lithium ion battery is initially charged at a constant current in a first step followed by charging the battery at a constant voltage when a specified voltage has been reached. This technique was developed to inhibit deleterious effects on the charge capacity of the battery and on the life of the battery. Battery charging methods have been described in U.S. Pat. No. 7,737,659 issued to Toni Morioka on Jun. 15, 2010. In addition to the charging techniques decreasing the life a battery, the discharging process also affects the life of a battery.

Accordingly, it would be advantageous to have a method and circuit for suitably discharging a power source such as, for example, a battery. It is desirable for the circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
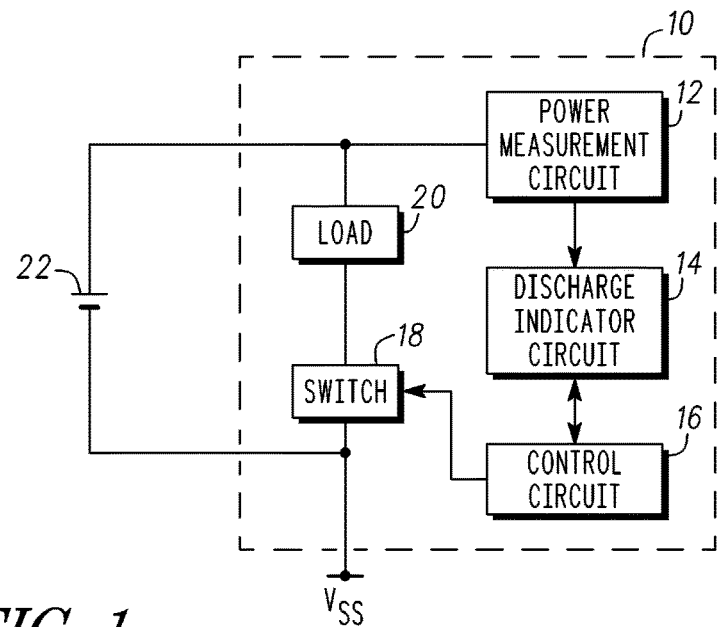
FIG. 1 is a block diagram of a battery circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

The present description includes, among other features, methods for discharging a power source such as, for example, a lithium ion battery and circuits suitable for use in discharging batteries. In accordance with one aspect, the capacity or charge level of the battery is determined or monitored. In response to the charge level being greater than a reference level, the battery is discharged to a predetermined level over a predetermined period of time, wherein the predetermined level and the period of time are user defined parameters. In accordance with an embodiment, the battery is discharged to a value that is 80% of its full capacity over a period of two weeks. In accordance with another embodiment, the predetermined period of time is at least one day. Other values and time periods may be selected depending on the desired performance criteria.

In accordance with another aspect the battery circuits may be monolithically integrated circuits.

In accordance with another aspect, the full capacity or charge level of a power source such as, for example, a battery is determined and monitored. If the battery remains at substantially full capacity for a predetermined period and the battery is not operating in a charging mode, i.e., being charged, the battery is substantially instantaneously discharged. Thus, a timer may be started in response to the battery being in a fully charged state and the battery may be discharged in response to the charge level being greater than the reference level, the battery circuit operating in the noncharging mode and the timer being greater than a predetermined period of time. For example, if the battery remains substantially fully charged for a period of one week and the battery is not operating in a charging mode, it is instantaneously or, alternatively, substantially instantaneously discharged to the reference level.

In accordance with another aspect, the full capacity or charge level of a power source such as, for example, a battery is determined and a zero capacity or charge level of the battery is determined and the reference level is set as a percentage of the full charge level.

In accordance with another aspect, a circuit suitable for use with a power source such as, for example, a battery is provided that includes a power measurement circuit having an input coupled for receiving a battery signal and connected to a load circuit that is configured to slowly discharge the battery in response to operating in a discharge mode. Because the load circuit is configured to slowly discharge the battery, it may be referred to as a micro-load circuit. A discharge indicator circuit has an input connected to the power measurement circuit and an input/output terminal connected to an input/output terminal of a control circuit. The control circuit has an output connected to the control terminal of a switch, which has a conduction terminal connected to the load. In response to operation in the discharge mode, the control circuit transmits a signal to the switch to close the switch and discharge the battery through the load.

In accordance with another aspect, a circuit suitable for use with a power source such as, for example, a battery, is provided that includes a power measurement circuit having an input coupled for receiving a battery signal and connected to a load circuit that is configured to quickly discharge the battery in response to operating in a discharge mode. Because the load circuit is configured to quickly discharge the battery, it may be referred to as a heavy load circuit. A discharge indicator circuit has an input connected to the power measurement circuit and an input/output terminal connected to an input/output terminal of a control circuit. The control circuit has an output connected to the control terminal of a switch, which has a conduction terminal connected to the load. A time measurement circuit is connected to another input/output terminal of the control circuit and a charging detection circuit is connected to an input/output terminal of the control circuit. The time measurement circuit measures the amount of time that the battery remains in a fully charged state and the charging detection circuit indicates whether the battery is operating in a charging mode. In response to the discharge indicator circuit indicating that the battery capacity is greater than a reference level, a time measurement circuit indicating that a predetermined time has elapsed, and the charging detection circuit indicating that the battery is not being charged, i.e., not operating in a charging mode, the control circuit transmits a control signal to the switch, turning it on and discharging the battery. In accordance with this aspect, the load circuit is configured to carry a large current to quickly and instantaneously or, alternatively, substantially instantaneously discharge the battery.

FIG. 1 is a block diagram of a battery circuit 10 suitable for discharging a power source such as, for example, a battery in accordance with an embodiment of the present invention. What is shown in FIG. 1 is a power measurement circuit 12 connected to a discharge indicator circuit 14 and to a control circuit 16 and coupled for receiving a source of operating potential from, for example, a power source 22. It should be noted that power source 22 may be a battery, a lithium ion battery, a capacitor, or the like. FIG. 1 also illustrates a switch 18 connected to control circuit 16 and to a load 20. More particularly, power measurement circuit 12 has an input connected to load 20 and to battery 22 and an output connected to an input of discharge indicator circuit 14. Discharge indicator circuit 14 has an input/output terminal connected to an input/output terminal of control circuit 16. By way of example, power measurement circuit 12 includes an analog-to-digital converter that converts the analog signal from power source 22 into a digital power measurement signal that represents the charge level of power source 22. The capacity of battery 22 may be referred to as the power level of the power source or the battery, the charge state of the power source or the battery, or the charge status of the power source or the battery.

The digital power measurement signal is transmitted to discharge indicator circuit 14, which is configured to determine the capacity of battery 22 that is represented by the digital power measurement signal. Discharge indicator circuit 14 generates an output signal in response to the capacity of battery 22, wherein the output signal serves as a control signal to instruct control circuit 16 to either discharge battery 22 or not to discharge battery 22, i.e., the output signal from discharge indicator circuit 14 serves as a discharge indicator signal. In response to the discharge indicator signal indicating that battery 22 should be discharged, control circuit 16 generates a control signal to turn on switch 18, or leave switch 18 on if it is already on, to discharge battery 22 through load 20. In response to the discharge indicator signal indicating that battery 22 is sufficiently discharged, control circuit 16 generates a control signal to turn off switch 18 or leave switch 18 off if it is already off.

By way of example, discharge indicator circuit 14 includes a plurality of comparators, switch 18 is an n-channel transistor configured as a switch, and load circuit 20 is a resistive load. It should be noted that in accordance with embodiments in which switch 18 is an n-channel transistor, a gate of the n-channel transistor serves as a control terminal of the switch and is connected control circuit 16, a drain of the n-channel transistor serves as a terminal of the switch and may be connected to load 20, and the source of the n-channel transistor serves as a terminal of the switch and may be coupled for receiving a source of operating potential such as, for example, $V_{SS}$. In accordance with embodiments in which switch 18 is a p-channel transistor, a gate of the p-channel transistor serves as a control terminal of the switch and is connected to control circuit 16, a source of the p-channel transistor serves as a terminal of switch 18 and may be connected to load 20, and a drain of the p-channel transistor is coupled for receiving a source of operating potential such as, for example, $V_{SS}$. By way of example, operating potential $V_{SS}$ is ground.

Figure 2:
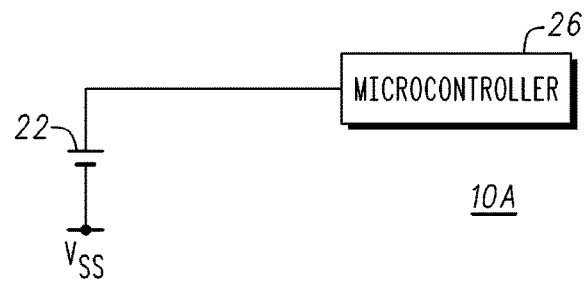
FIG. 2 is a block diagram of a battery circuit in accordance with another embodiment of the present invention.

FIG. 2 is a block diagram of a discharge circuit 10A suitable for discharging a power source such as, for example, a battery in accordance with another embodiment of the present invention. What is shown in FIG. 2 is a microcontroller 26 having an input connected to a power source 22 such as, for example a battery, load 20 and an output connected to switch 18, where load 20 may be a resistive load and switch 18 may be a transistor. Microcontroller 26 may include the functions of power measurement circuit 12, discharge indicator circuit 14, control circuit 16, switch 18, and load 20 described with reference to FIG. 1.

Figure 3:
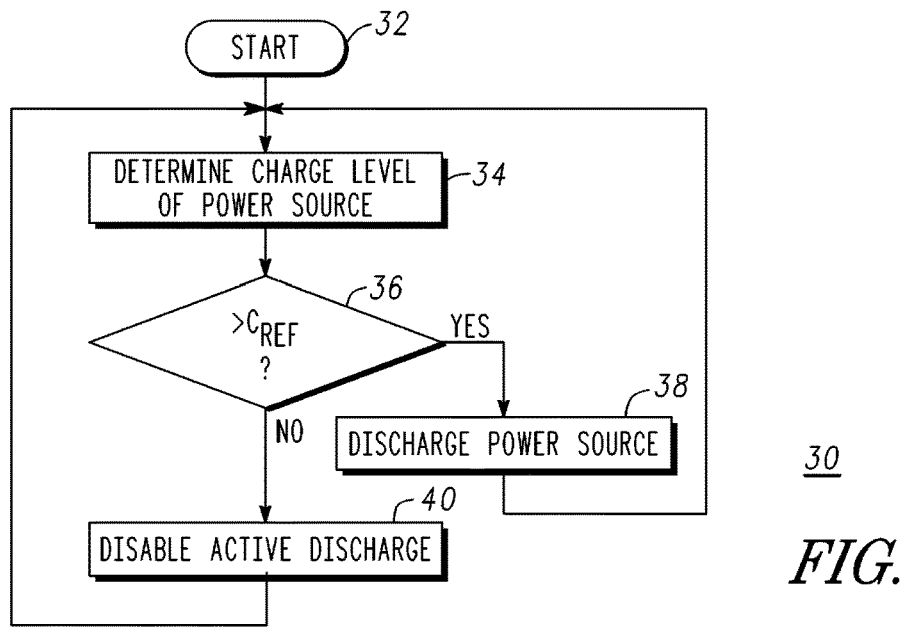
FIG. 3 is a flow diagram for maintaining a power source in accordance with another embodiment of the present invention.

FIG. 3 is a flow diagram 30 of a method for protecting or maintaining a power source 22 such as, for example, a battery in accordance with an embodiment of the present invention. At an early stage, indicated by box 32, operation of the battery circuit begins. It should be noted that the full capacity of the battery 22 may be determined by measurement, calculation, or provided by the battery manufacturer. At a step indicated by box 34, the capacity of battery 22 is determined and compared with a reference level $C_{REF}$ (indicated by decision diamond 36). In response to the capacity level being greater than reference level $C_{REF}$, battery 22 is discharged. For example, power measurement circuit 12 may determine or measure the capacity of battery 22 and discharge indicator circuit 14 may determine whether the capacity of battery 22 is greater than reference level $C_{REF}$. In response to the capacity being greater than reference level $C_{REF}$, control circuit 16 generates a control signal to turn on switch 18 to discharge power source 22 (indicated by box 38) to the reference level $C_{REF}$. In response to the capacity of battery 22 being less than reference level $C_{REF}$, control circuit 16 generates a control signal to turn off switch 18 or leave switch 18 off so that battery circuits 10 and 10A do not actively discharge battery 22 (indicated by box 40) and battery circuits 10 and 10A continue determining the charge level of the battery 22. Thus, battery circuits 10 and 10A periodically monitor or determine the charge level of battery 22. It should be noted that that although battery circuits 10 and 10A actively discharge battery 22, it may also be discharged by leakage or other parasitic effects.

As discussed above, the full capacity of battery 22 may be determined by measurement or by specifications supplied by the battery manufacturer. The reference level may be selected to be at a percentage of the capacity of the battery, a percentage of the battery level, etc. By way of example, reference level $V_{REF}$ is selected to be 80% of the capacity of the battery. As those skilled in the art are aware, the capacity of a battery is the current that can be delivered at a specified voltage over a specified period of time. For example, a battery having a capacity of 2000 milliamp-hours (mAH) can deliver 100 milliamps of current for 20 hours at room temperature at the specified voltage. Reference level $C_{REF}$ may be calculated as a percentage of the battery capacity. For example, a reference level of 80% of the capacity may be determined as a level at which a battery can deliver 100 milliamps of current for 16 hours at room temperature at the specified voltage.

Figure 4:
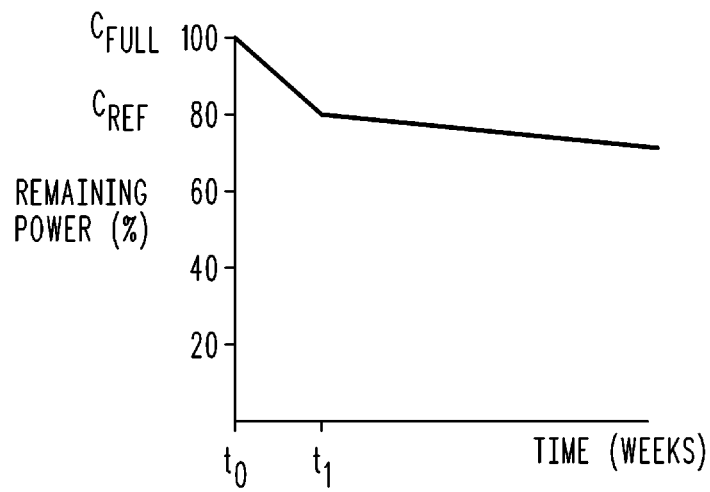
FIG. 4 is a plot for maintaining a power source in accordance with an embodiment of the present invention.

Battery circuits 10 and 10A are configured to decrease the charge level or capacity of battery 22 over a predetermined period of time in response to the power level being greater than reference level $C_{REF}$. Briefly referring to FIG. 4, a plot 40 of the remaining power or charge in a power source 22 such as, for example, a battery is illustrated. At time $t_0$, the capacity of battery 22 is 100%, i.e. $C_{FULL}$. Battery circuit 10 (or battery circuit 10A) monitors the capacity of battery 22 to determine whether it is greater than or less than a reference level $C_{REF}$. Because the capacity is greater than reference level $C_{REF}$ at time $t_0$, battery circuit 10 (or battery circuit 10A) is configured to discharge battery 22 to reference level $C_{REF}$ over a predetermined period of time. By way of example, reference level $C_{REF}$ is 80% of the full capacity of battery 22, i.e., the total energy that power source 22 is capable of storing, and the predetermined time period ends at time $t_1$, which may be two weeks. In response to the charge level being 80% of full capacity, battery circuit 10 or (battery circuit 10A) changes from the discharge operating mode to the quiescent or nondischarge operating mode and stops actively discharging battery 22. As mentioned above, in the quiescent operating mode battery 22 discharges because of parasitics associated with battery 22 and battery circuit 10 (or battery circuit 10A). The value of reference level $V_{REF}$ is not limited to being 80% and the predetermined time period is not limited to two weeks. Other suitable reference levels include 85%, 83%, 77%, 75%, 71%, 70%, or some other percentage of the battery capacity; and other time periods or times $t_1$ include at least a day, one week, ten days, one month, six weeks, two months, or some other desirable time period.

Figure 5:
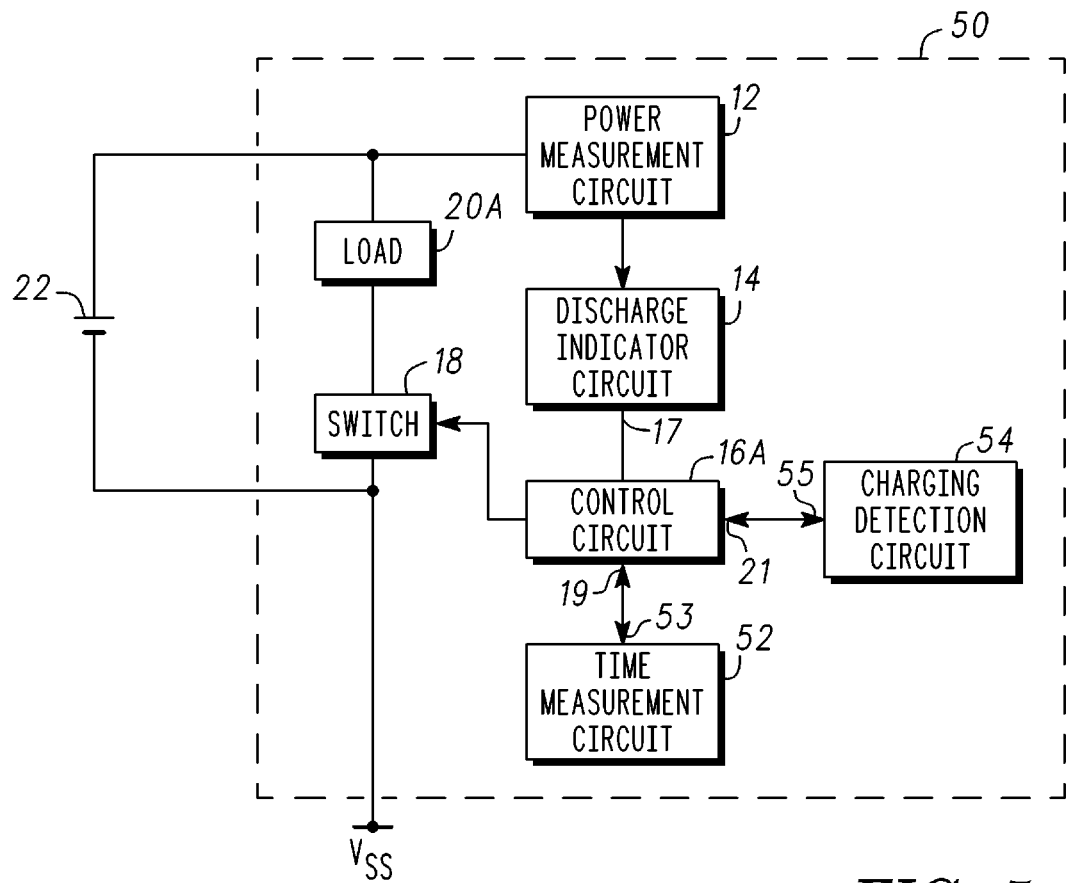
FIG. 5 is a block diagram of a battery circuit in accordance with another embodiment of the present invention.

FIG. 5 is a block diagram of a battery circuit 50 suitable for discharging a power source such as, for example, a battery, in accordance with another embodiment of the present invention. Like battery circuit 10, battery circuit 50 includes power measurement circuit 12 connected to discharge indicator circuit 14 and control circuit 16A, and switch 18 connected to control circuit 16A. In addition, battery circuit 50 includes a time measurement circuit 52 having an input/output terminal 53 connected to an input/output terminal 19 of control circuit 16A, a charging detection circuit 54 having an input/output terminal 55 connected to an input/output terminal 21 of control circuit 16A, and a load circuit 20A. It should be noted that battery circuit 50 includes a load circuit 20A which may have a different configuration from load circuit 20. Because control circuits 16 and 16A and load circuits 20 and 20A may be different, reference character A has been appended to reference character 16 of control circuit 16 and reference character 20 of load circuit 20 in FIG. 5. It should be further noted that in accordance with alternative embodiments, components such as, for example, power measurement circuit 12, discharge indicator circuit 14, control circuit 18, time measurement circuit 52, and charging detection circuit 54 may be implemented with a microcomputer.

Figure 6:
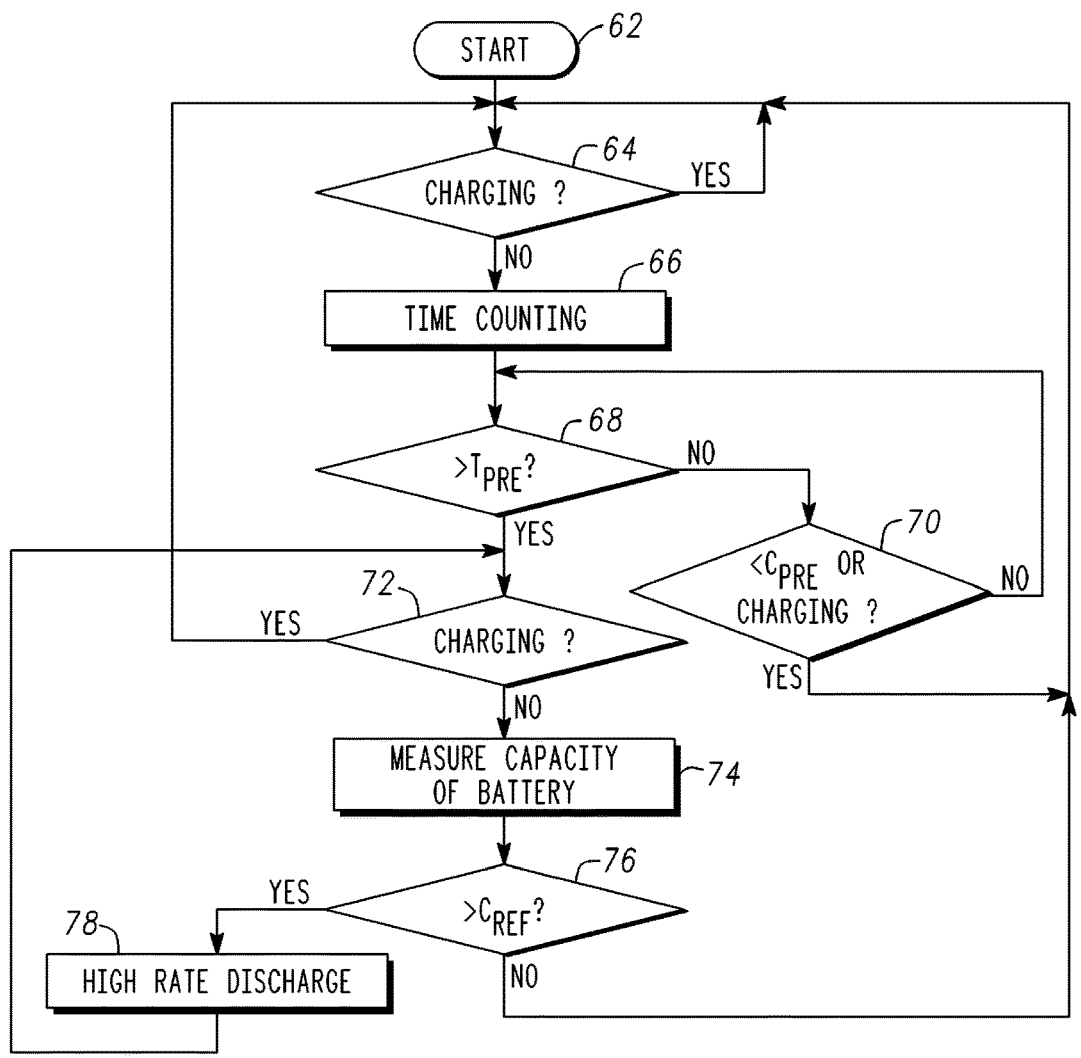
FIG. 6 is a flow diagram for maintaining a power source in accordance with another embodiment of the present invention.

FIG. 6 is a flow diagram 60 of a method for operating a power source 22 such as, for example, a battery in accordance with an embodiment of the present invention. At an early stage, indicated by box 62, operation of battery circuit 50 begins. At a step indicated by decision diamond 64, battery 22 is monitored to detect whether it is being charged. If battery 22 is being charged or operating in a charging mode, i.e., a yes response, battery circuit 50 continues to monitor whether it is being charged. If the battery 22 is not being charged or operating in a noncharging mode, i.e., a no response, then a timer is started (indicated by box 66) to indicate the time period that the battery has been fully charged or has been at full capacity. The timer may be a counter. At a step indicated by decision diamond 68, battery circuit 50 determines whether battery 22 has been fully charged for a time period greater than a predetermined period of time $T_{PRE}$. By way of example, time $T_{PRE}$ may be a week. If the battery has not been fully charged for the predetermined period of time $T_{PRE}$ (i.e., a no response), battery circuit 50 checks whether it is at a capacity or charge level of greater than a predetermined capacity level $C_{PRE}$ or whether it is being charged or operating in the charging mode (indicated by decision diamond 70). By way of example the predetermined capacity level $C_{PRE}$ is 80% of the full capacity level. If the battery capacity is greater than the predetermined capacity level $C_{PRE}$ or if battery 22 is not being charged or operating in the noncharging mode, battery circuit 50 continues to monitor the time at which battery 22 exceeds the predetermined charge level $C_{PRE}$ as indicated by returning to decision diamond 68, i.e., a no response. If battery 22 is at a capacity level less than the predetermined capacity level $C_{PRE}$ or if it is being charged, battery circuit 50 returns to decision diamond 64 to continue monitoring the charge level of battery 22.

In response to the measured time exceeding the predetermined period of time (i.e., a yes response), battery circuit 50 determines whether battery 22 is being charged (indicated by decision diamond 72). If battery 22 is being charged, battery circuit 50 returns to decision diamond 64. In response to battery 22 not being charged, battery circuit 50 measures the capacity of battery 22 (indicated by box 74) and if it is less than predetermined capacity level $C_{PRE}$, battery circuit 50 returns to decision diamond 64 (indicated by a no response at decision diamond 76). If battery 22 is at a charge level greater than predetermined charge level $C_{PRE}$, battery circuit 50 discharges battery 22 through load 20 to capacity level $C_{PRE}$ at a high discharge rate (indicated by decision diamond 78) and returns to decision diamond 72 (indicated by a yes response at decision diamond 76). A high discharge rate may be a rate that is instantaneous or, alternatively, substantially instantaneous.

Figure 7:
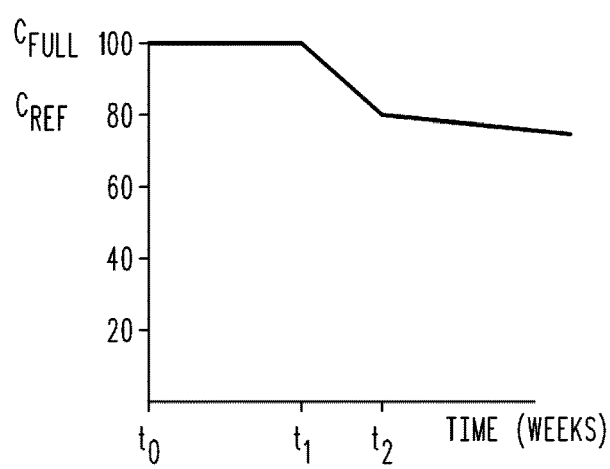
FIG. 7 is a plot for maintaining a power source in accordance with another embodiment of the present invention.

FIG. 7 is a plot 80 of the remaining power or charge in a power source 22 such as, for example a battery in response to power source 22 being discharged in accordance with embodiments of the present invention. At time $t_0$, the capacity or capacity level of battery 22 is 100%. Battery circuit 50 monitors the power level of battery 22. Because the battery capacity is greater than reference level $C_{REF}$ for predetermined period of time $t_1$, battery circuit 50 discharges battery 22. In FIG. 7, time $t_1$ represents the time at which discharge circuit 50 begins discharging battery 22. It should be noted that battery circuit 50 may be configured to instantaneously, or alternatively, substantially instantaneously discharge battery 22 to reference level $C_{REF}$ after predetermined period of time $t_1$. Thus, battery circuit 50 discharges battery 22 from a capacity of 100% to a capacity of 80% from time $t_1$ to time $t_2$. By way of example, the time period between times $t_1$ and $t_2$ is about five hours. The time period between times $t_1$ and $t_2$ may be less than five hours or greater than 5 hours. In response to battery 22 being discharged to 80% of its full capacity, circuit 50 discontinues discharging battery 22.

By way of example, reference level $C_{REF}$ is 80% of the total capacity of battery 22 and the time period between times $t_0$ and $t_1$ is two weeks. In response to the measured charge level being greater than 80% for two weeks after detection of a fully charged state, battery circuit 50 instantaneously discharges battery 22 to be at a capacity of 80%. In response to the battery capacity being 80%, battery circuit 50 changes from the discharge operating mode to the nondischarge operating mode and stops discharging battery 22. In the nondischarge operating mode, battery 22 may be discharged because of parasitics associated with battery 22. The value of reference level $C_{REF}$ is not limited to being 80% and the predetermined time period is not limited to two weeks. Other suitable reference levels include 85%, 83%, 77%, 75%, 71%, 70%, or some other reference level and other time periods include one week, ten days, one month, six weeks, two months, or some other desirable time period.

By now it should be appreciated that a battery circuit and methods of discharging a power source such as, for example, a battery have been provided. Advantages of the battery circuit and the methods in accordance with embodiments of the present invention include improving the life of the battery, reducing deterioration of the battery, and mitigating issues associated with batteries being fully charged for extended periods of time. In addition, embodiments of the present invention allow controllably discharging batteries without powering down the systems in which they are used.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for reducing deterioration of a battery due to the battery being fully charged for extended periods of time, comprising:
   determining a charge level of the battery;
   discharging the battery using a technique comprising:
   determining whether the battery is operating in a charging mode or a noncharging mode;
   in response to the charge level of the battery being full and the battery operating in the noncharging mode, instantaneously discharging the battery, wherein an instantaneous discharge occurs over a time period, time $t_1$ to time $t_2$, and to a level that is 70% or greater of the full charge level, wherein discharging the battery below the full charge level reduces deterioration of the battery.

2. The method of claim 1, further including determining a full charge level of the battery and a zero charge level of the battery and setting a reference level as a percentage of the full charge level.

3. The method of claim 1, wherein determining the charge level of the battery comprises periodically determining the charge level of the battery.

4. The method of claim 1, wherein discharging the battery includes discharging the charge level of the battery to a reference level.

5. The method of claim 1, wherein discharging the battery includes discharging the battery through a load coupled to the battery.

6. The method of claim 5, wherein discharging the battery includes closing a switch coupled to the load.

7. The method of claim 1, wherein determining a charge level of the battery includes determining that the battery is fully charged.

8. A method for reducing deterioration of a battery due to the battery being fully charged for extended periods of time, comprising:
   monitoring a charge level of the battery;
   in response to the charge level of the battery being at the full charge level and the battery operating in a noncharging mode, instantaneously discharging the battery wherein an instantaneous discharge discharges the battery to a level that is 70% or greater than the full charge level, wherein discharging the battery below the full charge level improves the life of the battery.

9. The method of claim 8, wherein monitoring the charge level of the battery includes detecting the battery being in a fully charged state.

10. A battery circuit suitable for use with a battery and configured to reduce deterioration of the battery in response to the battery being fully charged, comprising:
    a power measurement circuit having at least one input and an output and comprising an analog-to-digital converter configured to convert the analog signal from the battery into a digital power measurement signal;
    a discharge indicator circuit having an input and an output, the input coupled to the output of the power measurement circuit, wherein the discharge indicator circuit is configured to generate a discharge indicator signal in response to a capacity of the battery, and wherein the discharge indicator signal indicates that the battery is to be one of discharged or not discharged;
    a control circuit having an output and a first input/output terminal, a second input/output terminal, and a third input/output terminal, the first input/output terminal coupled to the output of the discharge indicator circuit;

a time measurement circuit having an input/output terminal coupled to the second input/output terminal of the control circuit, the time measurement circuit comprising a counter, and wherein the control circuit is configured to generate a control signal in response to the discharge indicator signal indicating that the battery is to be discharged and that the battery is at full capacity;

a switch having a control terminal and first and second conduction terminals, the control terminal coupled to the output of the control circuit, wherein the control signal from the control circuit closes the switch or leaves the switch in a closed configuration if it is already in the closed configuration; and a load internal to the battery circuit and coupled between a first input of the at least one input of the power measurement circuit and the first conduction terminal of the switch, wherein the control circuit is configured to close the switch to instantaneously discharge the battery through the load over a time period, time $t_1$ to time $t_2$.

11. The circuit module of claim 10, further including a charging circuit having an input/output terminal coupled to the third input/output terminal of the control circuit.

12. The circuit module of claim 10, wherein the power measurement circuit, the discharge indicator circuit, the control circuit, the switch, and the load comprise a microcontroller.

\* \* \* \* \*